United States Patent

Kitahara

[11] Patent Number: 6,141,084
[45] Date of Patent: Oct. 31, 2000

[54] IMAGING LENS FOR COPYING AND COPYING APPARATUS

[75] Inventor: You Kitahara, Omiya, Japan

[73] Assignee: Fuji Photo Optical Co., Ltd., Saitama, Japan

[21] Appl. No.: 09/221,833

[22] Filed: Dec. 29, 1998

[30] Foreign Application Priority Data

Feb. 6, 1998 [JP] Japan .................................. 10-041081

[51] Int. Cl.[7] ............................. G03B 27/54; G02B 3/00; G02B 9/14; G02B 9/12
[52] U.S. Cl. ........................... 355/67; 359/654; 359/789; 359/785; 359/784
[58] Field of Search .................................. 359/654, 789, 359/785, 784; 355/67

[56] References Cited

U.S. PATENT DOCUMENTS

| | | | |
|---|---|---|---|
| 5,172,272 | 12/1992 | Aoki | 359/654 |
| 5,268,791 | 12/1993 | Tsuchida | 359/654 |
| 5,680,254 | 10/1997 | Ueda et al. | 359/652 |
| 5,861,987 | 1/1999 | Nakamura et al. | 359/434 |
| 5,973,850 | 10/1999 | Nagaoka | 359/654 |

*Primary Examiner*—Russell Adams
*Assistant Examiner*—Khaled Brown

*Attorney, Agent, or Firm*—Snider & Associates; Ronald R. Snider

[57] ABSTRACT

In a three-lens configuration, the first lens is formed into a biconvex lens, the third lens is formed into a positive meniscus lens having a concave surface directed onto the object side, and the refractive index distribution of the refractive index distribution type second lens is defined by a predetermined conditional expression, whereby various kinds of aberration are made favorable even when used for reading out images at a magnification near 1:1, while achieving wider angle of view, higher performances, and compactness. An imaging lens for copying to be used at a magnification near 1:1 comprises the first lens $L_1$ having a biconvex form, the second lens $L_2$ having a biconcave form with a refractive index distribution along the optical axis direction, and the third lens $L_3$ made of a positive meniscus lens having a concave surface directed onto the object side, whereas a stop i is disposed between the second lens $L_2$ and the third lens $L_3$. The refractive index of the second lens $L_2$ gradually decreases from the object side to the image side. The difference $\Delta n$ between the respective refractive index values at the object-side surface apex and image-side apex of the second lens $L_2$ is made smaller than 0.1, and the refractive index distribution in the second lens $L_2$ is represented by a predetermined conditional expression.

3 Claims, 6 Drawing Sheets

FIG.1

FIG. 3C
EXAMPLE 2
ω=21.2°
DISTORTION (%)

FIG. 3B
EXAMPLE 2
ω=21.2°
ASTIGMATISM (mm)

FIG. 3A
EXAMPLE 2
F/8.0
— g-LINE
--- e-LINE
--- C-LINE
SPHERICAL ABERRATION (mm)

FIG. 4C
EXAMPLE 3
ω = 21.1°

FIG. 4B
EXAMPLE 3
ω = 21.1°

FIG. 4A
EXAMPLE 3
F/8.0

FIG.5C EXAMPLE 4 ω=21.4° DISTORTION (%)

FIG.5B EXAMPLE 4 ω=21.4° ASTIGMATISM (mm)

FIG.5A EXAMPLE 4 F/10.0 SPHERICAL ABERRATION (mm)

FIG.6

IMAGING LENS FOR COPYING AND COPYING APPARATUS

RELATED APPLICATIONS

This application claims the priority of Japanese Patent Application No. 10-41081 filed on Feb. 6, 1998, which is incorporated herein by reference.

BACKGROUND OF THE INVENTION

1. Field of the Invention

The present invention relates to an imaging lens for copying, and a copying apparatus such as copier, platemaker, or the like using this imaging lens for copying; and, in particular, to an imaging lens for copying and a copying apparatus, having a refractive index distribution type lens, used for reading out images at a magnification near 1:1.

2. Description of the Prior Art

Conventionally known as an imaging lens used in a copying apparatus such as facsimile machine, image scanner, or the like is that of a three-sheet configuration having a refractive index distribution type lens (Japanese Unexamined Patent Publication No. 7-294804).

The imaging lens disclosed in the above-mentioned publication comprises, successively from the object side, a first lens made of a positive meniscus lens having a convex surface directed onto the object side, a second lens made of a biconcave lens, and a third lens made of a biconvex lens, in which at least one lens is a refractive index distribution type lens, thereby being capable of achieving wider angle of view and higher performances and making the whole lens compact.

The imaging lens disclosed in the above-mentioned publication, however, is aimed at reducing an original image to about 1/10 and forming thus reduced image onto a solid-state imaging device such as CCD. Therefore, it is not so suitable for reading out images at a magnification near 1:1, which is the most important in the copier, platemaker, and the like. Hence, when used for reading an image at a magnification near 1:1, various kinds of aberration become very large in the read-out image.

SUMMARY OF THE INVENTION

In view of such circumstances, it is an object of the present invention to provide an imaging lens for copying and a copying apparatus which can make various kinds of aberration favorable even when used for reading images at a magnification near 1:1, while achieving wider angle of view, high performances, and compactness.

The imaging lens in accordance with the present invention is an imaging lens for copying to be used at a magnification near 1:1, the imaging lens comprising, successively from an object side, a first lens having a biconvex form, a second lens having a biconcave form with a refractive index distribution along an optical axis direction, and a third lens made of a positive meniscus lens having a concave surface directed onto the object side;

wherein the second lens has a refractive index decreasing from the object side to an image side, and a difference $\Delta n$ between respective refractive index values at an object-side surface apex of the second lens and an image-side surface apex thereof satisfies the following conditional expression (1):

$$0 \leq \Delta n \leq 0.1 \tag{1}$$

and;

wherein, letting a point on the optical axis in the second lens at which the refractive index equals $n_0$ be a reference point, the distance from the reference point to the object-side surface apex of the second lens be a, and a distance from the object-side surface apex of the second lens along the optical axis direction be z, the refractive index $n(z)$ of the second lens is represented by the following conditional expression (2):

$$n(z) = \sum_{i=0}^{n} n_i (z+a)^i; \quad 5 \leq N \tag{2}$$

The copying apparatus in accordance with the present invention comprises the above-mentioned imaging lens for copying.

Here, "magnification near 1:1" refers to a magnification within the range of 0.6× to 1.6×, for example.

DESCRIPTION OF THE PREFERRED EMBODIMENTS

In the following, embodiments of the present invention will be explained.

Figure 6:
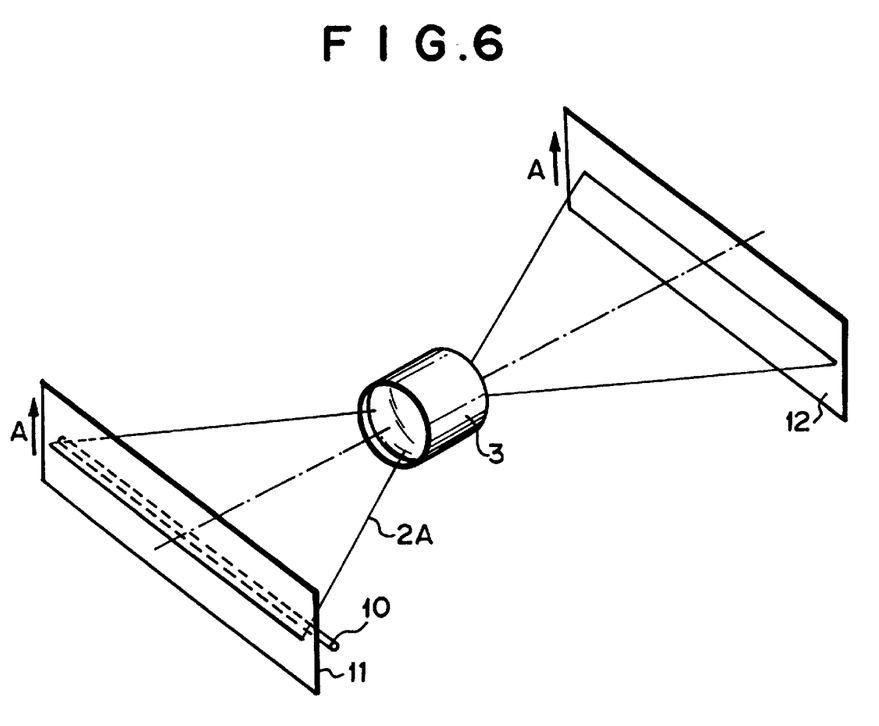
FIG. 6 is a perspective view showing a copying apparatus equipped with the imaging lens for copying in accordance with an embodiment of the present invention.

FIG. 6 is a perspective view showing a copying apparatus equipped with an imaging lens for copying in accordance with an embodiment of the present invention. This copying apparatus comprises an elongated white light source 10, disposed close to an original 11 mounted on a glass sheet (depicted as a glass sheet 1 in FIG. 1), extending in a direction orthogonal to the sub-scanning direction for the original (direction of arrow A); and an imaging lens for copying 3 for forming onto printing paper 12 (moving in the direction of arrow A in synchronization with the original 11) an image of reflected light 2A from the original 11 in light emitted from the while light source 10.

Here, the white light source 10 emits light having substantially a flat wavelength characteristic over the whole visible light region.

In the copying apparatus, the imaging lens 3 forms onto the printing paper 12 an image on the original 11 at a magnification near 1:1, whereby it is necessary to make various kinds of aberration favorable while achieving wider angle of view, higher performances, and compactness. In order to enable these features, the imaging lens has a lens configuration shown in FIG. 1.

Figure 1:
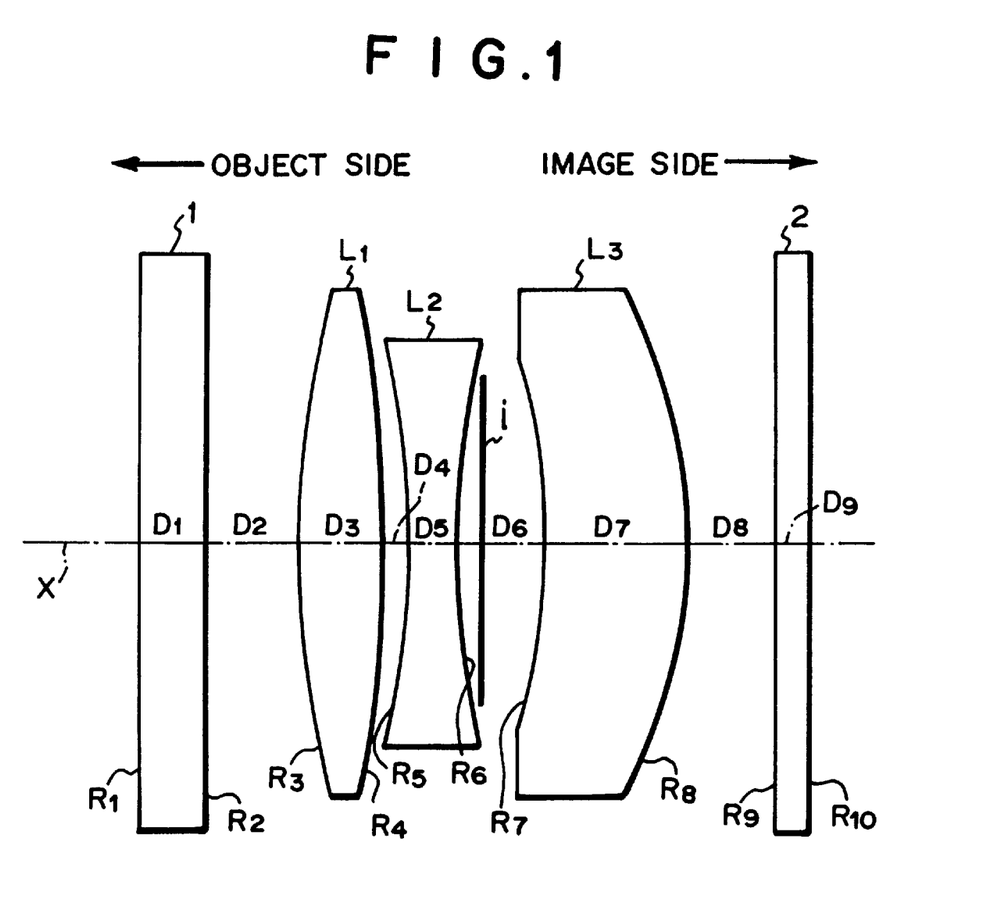
FIG. 1 is a view showing the lens configuration of the imaging lens for copying in accordance with an embodiment of the present invention.
Figure 2A:
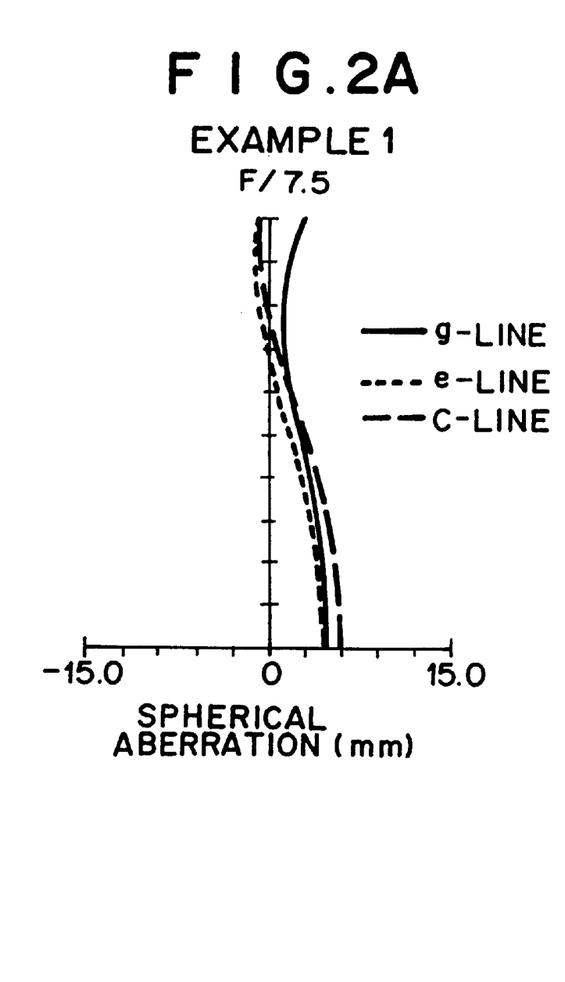
FIGS. 2A, 2B and 2C are aberration charts showing various kinds of aberration in the imaging lens for copying in accordance with Example 1 of the present invention.
Figure 2B:
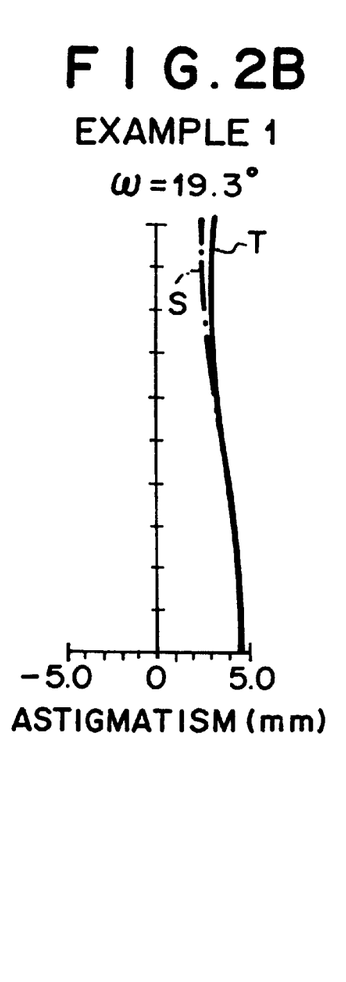
Figure 2C:
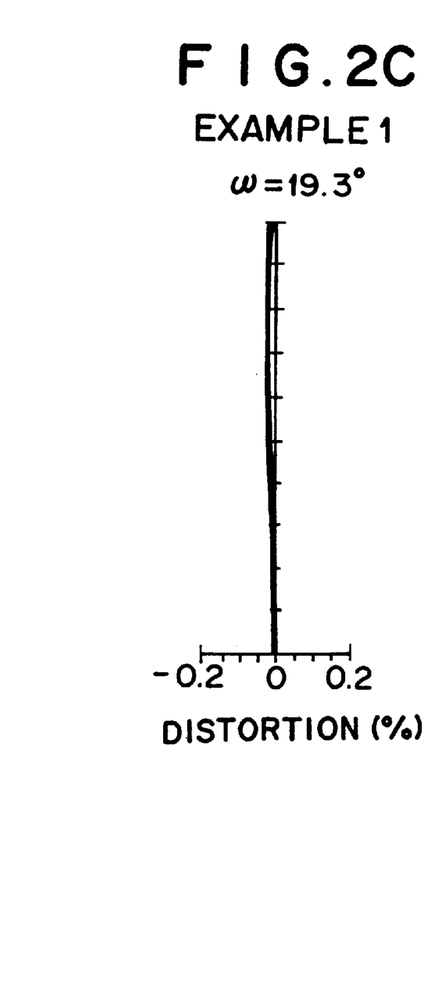
Figure 3A:
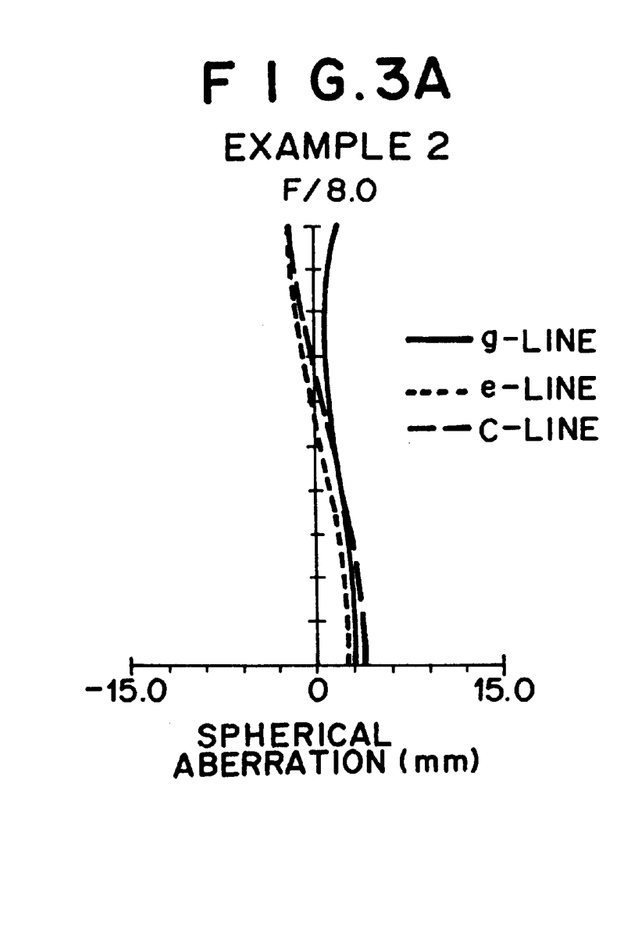
FIGS. 3A, 3B and 3C are aberration charts showing various kinds of aberration in the imaging lens for copying in accordance with Example 2 of the present invention.
Figure 3B:
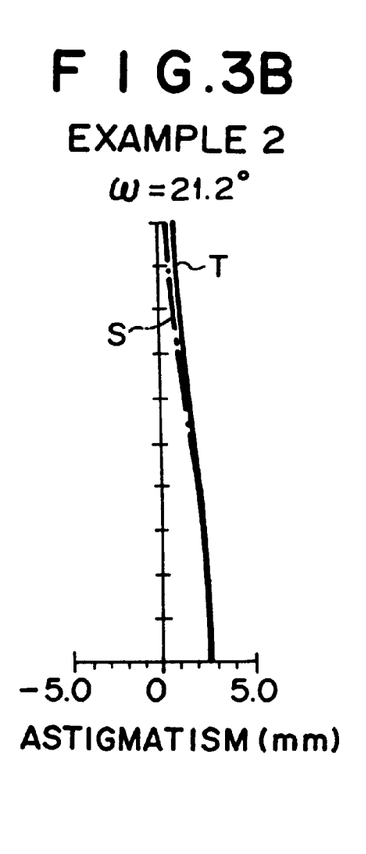
Figure 3C:
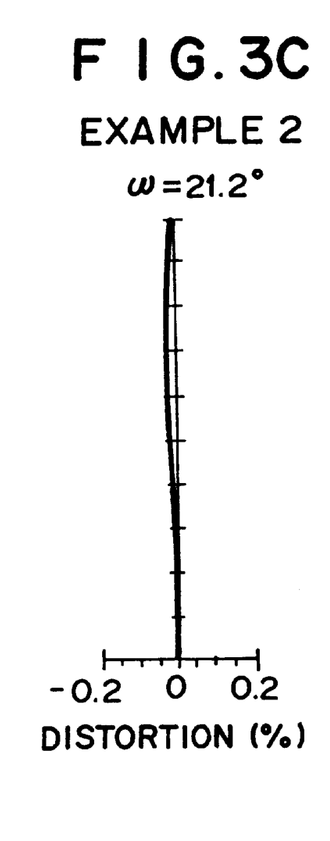
Figure 4A:
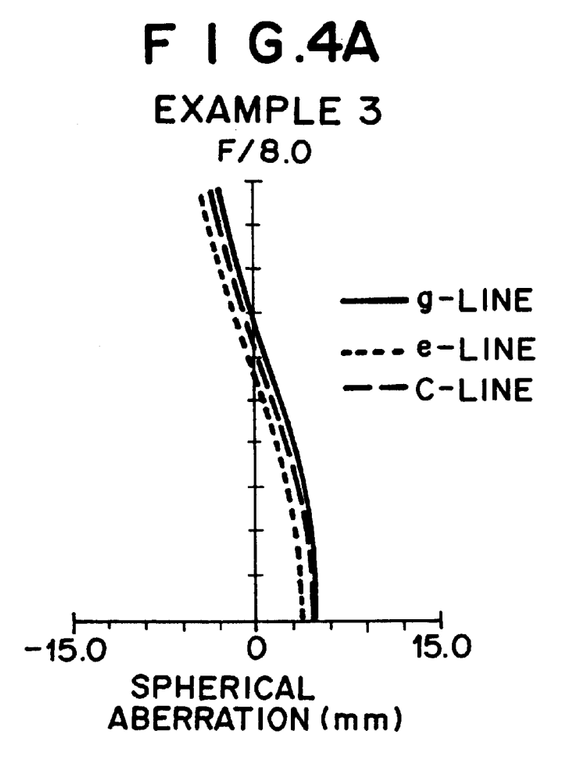
FIGS. 4A, 4B and 4C are aberration charts showing various kinds of aberration in the imaging lens for copying in accordance with Example 3 of the present invention.
Figure 4B:
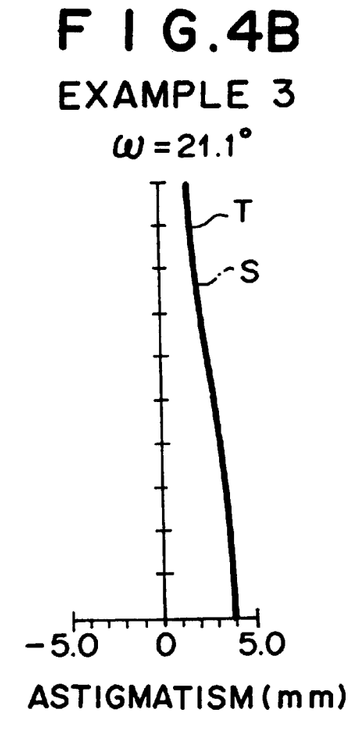
Figure 4C:
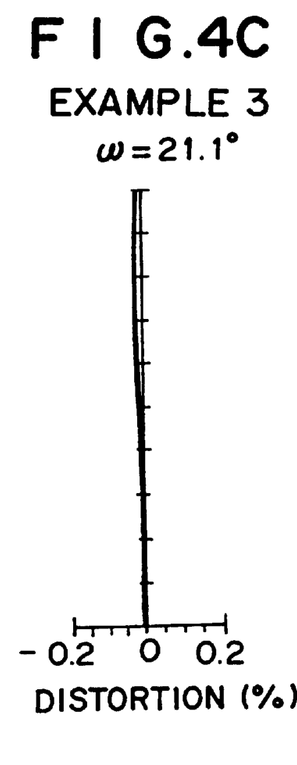
Figure 5A:
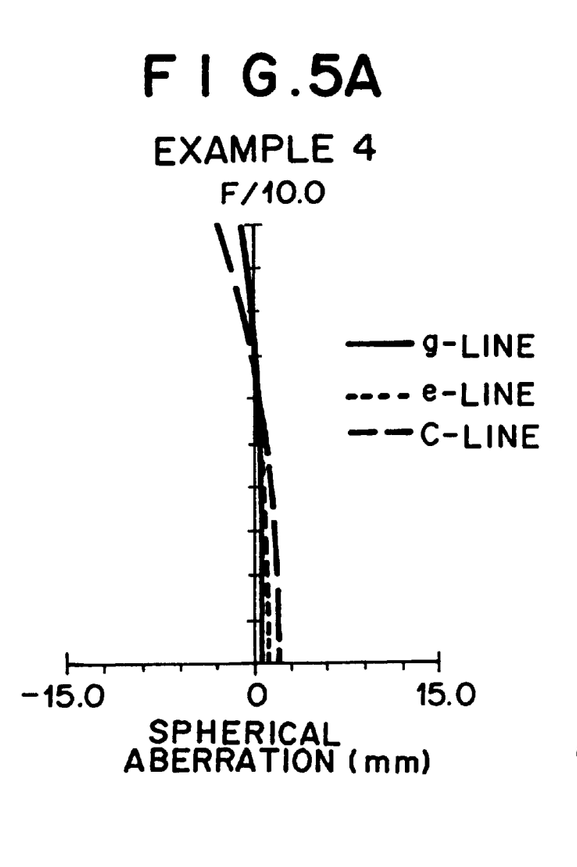
FIGS. 5A, 5B and 5C are aberration charts showing various kinds of aberration in the imaging lens for copying in accordance with Example 4 of the present invention.
Figure 5B:
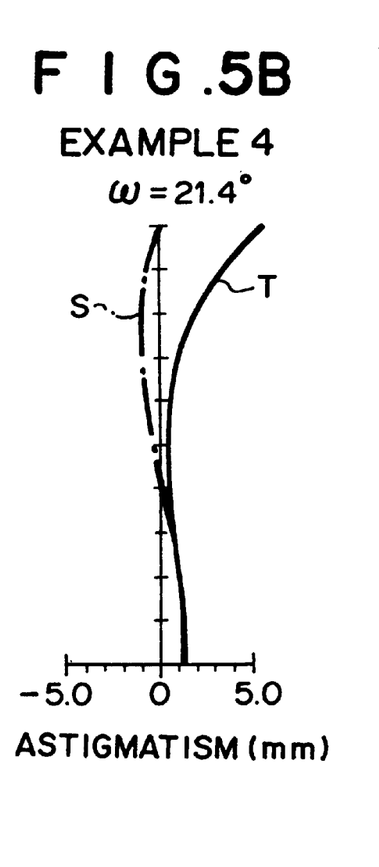
Figure 5C:
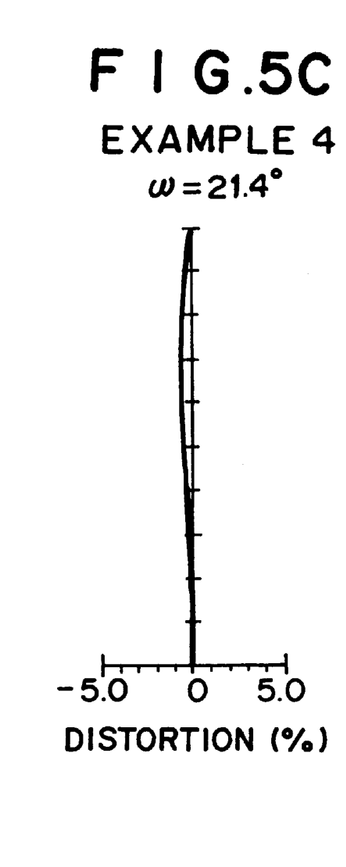

Namely, the imaging lens 3 is an imaging lens for copying to be used at a magnification near 1:1, comprising, successively from the object side, a first lens $L_1$ having a biconvex form, a second lens $L_2$ having a biconcave form with a refractive index distribution along the optical axis direction, and a third lens $L_3$ made of a positive meniscus lens having a concave surface directed onto the object side; whereas a stop i is disposed between the second lens $L_2$ and the third lens $L_3$.

Also, the second lens $L_2$ has a refractive index decreasing from the object side to the image side, and the difference $\Delta n$ between the respective refractive index values at the object-side surface apex and image-side surface apex of the second lens $L_2$ satisfies the following conditional expression (1):

$$0 \leq \Delta n \leq 0.1 \qquad (1)$$

Further, letting a point on the optical axis X in the second lens $L_2$ at which the refractive index equals $n_0$ be a reference point, the distance from the reference point to the object-side surface apex of the second lens $L_2$ be a, and a distance from the object-side surface apex of the second lens $L_2$ along the optical axis direction be z, the refractive index n(z) of the second lens $L_2$ is represented by the following conditional expression (2):

$$n(z) = \sum_{i=0}^{n} n_i (z+a)^i ; 5 \leq N \qquad (2)$$

As mentioned above, when the third lens $L_3$ is constituted by two surfaces each having a center of curvature on the stop i side, the number of lenses positioned on the image surface side of the stop i can be set to 1, while keeping image surface curvature and distortion at favorable levels. Also, as a glass material having an axial refractive index distribution is used for the second lens $L_2$, spherical aberration, axial chromatic aberration, and chromatic aberration in magnification can be reduced.

EXAMPLES

The imaging lens for copying in accordance with the present invention will now be explained further specifically with reference to Examples 1 to 4.

Example 1

Table 1 (follows) shows the radius of curvature R (mm) of each lens surface, center thickness of each lens and air gap between neighboring lenses (hereinafter collectively referred to as axial spacing) D (mm), and refractive index $n_d$ and Abbe number $\upsilon_d$ of each lens at d-line in the imaging lens for copying in accordance with Example 1. The surface number in Table 1 successively increases from the object side.

Also, the upper part of Table 1 shows the focal length (f), F number ($F_{NO}$), and half angle of view ($\omega$) of the whole system. Further, the lower part of Table 1 shows the values of constant a (letting a point on the optical axis X in the second lens $L_2$ at which the refractive index equals $n_0$ be a reference point, the distance from the reference point to the object-side surface apex of the second lens $L_2$), variable N, difference $\Delta n$ between the respective refractive index values at the object-side surface apex and image-side surface apex in the second lens $L_2$, and the respective coefficients from zero order to N-th order in the above-mentioned conditional expression (2).

The following conditional expression (3) indicates an expression representing the Abbe number $\upsilon(z)$ of the second lens $L_2$.

$$\upsilon(z)=\{n(z)-1\}/\{0.133562 \times n(z)^3 - 0.649057 \times n(z)^2 + 1.126167 \times n(z) - 0.671883\} \qquad (3)$$

Example 2

Table 2 (follows) shows the radius of curvature R (mm) of each lens surface, axial spacing D (mm), and refractive index $n_d$ and Abbe number $\upsilon_d$ of each lens at d-line in the imaging lens for copying in accordance with Example 2. The surface number in Table 2 successively increases from the object side.

Also, the upper part of Table 2 shows the focal length (f), F number ($F_{NO}$), and half angle of view ($\omega$) of the whole system. Further, the lower part of Table 2 shows the values of constant a (letting a point on the optical axis X in the second lens $L_2$ at which the refractive index equals $n_0$ be a reference point, the distance from the reference point to the object-side surface apex of the second lens $L_2$), variable N, difference $\Delta n$ between the respective refractive index values at the object-side surface apex and image-side surface apex in the second lens $L_2$, and the respective coefficients from zero order to N-th order in the above-mentioned conditional expression (2).

The above-mentioned conditional expression (3) indicates an expression representing the Abbe number $\upsilon(z)$ of the second lens $L_2$.

Example 3

Table 3 (follows) shows the radius of curvature R (mm) of each lens surface, axial spacing D (mm), and refractive index $n_d$ and Abbe number $\upsilon_d$ of each lens at d-line in the imaging lens for copying in accordance with Example 3. The surface number in Table 3 successively increases from the object side.

Also, the upper part of Table 3 shows the focal length (f), F number ($F_{NO}$), and half angle of view ($\omega$) of the whole system. Further, the lower part of Table 3 shows the values of constant a (letting a point on the optical axis X in the second lens $L_2$ at which the refractive index equals $n_0$ be a reference point, the distance from the reference point to the object-side surface apex of the second lens $L_2$), variable N, difference $\Delta n$ between the respective refractive index values at the object-side surface apex and image-side surface apex in the second lens $L_2$, and the respective coefficients from zero order to N-th order in the above-mentioned conditional expression (2).

The above-mentioned conditional expression (3) indicates an expression representing the Abbe number $\upsilon(z)$ of the second lens $L_2$.

Example 4

Table 4 (follows) shows the radius of curvature R (mm) of each lens surface, axial spacing D (mm), and refractive index $n_d$ and Abbe number $\upsilon d$ of each lens at d-line in the imaging lens for copying in accordance with Example 4. The surface number in Table 4 successively increases from the object side.

Also, the upper part of Table 4 shows the focal length (f), F number ($F_{NO}$), and half angle of view ($\omega$) of the whole system. Further, the lower part of Table 4 shows the values of constant a (letting a point on the optical axis X in the second lens $L_2$ at which the refractive index equals $n_0$ be a reference point, the distance from the reference point to the object-side surface apex of the second lens $L_2$), variable N, difference Δn between the respective refractive index values at the object-side surface apex and image-side surface apex in the second lens $L_2$, and the respective coefficients from zero order to N-th order in the above-mentioned conditional expression (2).

The above-mentioned conditional expression (3) indicates an expression representing the Abbe number $\upsilon(z)$ of the second lens $L_2$.

FIGS. 2A to 5C are aberration charts showing various kinds of aberration in the imaging lenses for copying in accordance with Examples 1 to 4, respectively. Each aberration chart represents the state where a glass sheet (corresponding to a platen glass) having a thickness of 3.90 mm and a glass sheet 2 (corresponding to a partition between a lens system and a drum) having a thickness of 1.90 mm are inserted in the optical path on the object side and the image surface side, respectively.

As can be seen from these aberration charts, imaging lenses for copying having favorable imaging performances extending to marginal portions of the view field can be obtained in accordance with these Examples.

Also, without being restricted to those of the above-mentioned embodiment, the imaging lens and copying apparatus in accordance with the present invention can be modified in various manners. For example, as the value of N in conditional expression (2), any number of 5 and over can be chosen.

As explained in the foregoing, in the imaging lens for copying and the copying apparatus in accordance with the present invention, the imaging lens is constituted by three lenses, the first lens positioned closest to the object is formed into a biconvex lens, the third lens positioned closest to the image is formed into a positive meniscus lens, and the refractive index distribution of the second lens, which is a refractive index distribution type lens, is configured to satisfy the above-mentioned conditional expressions (1) and (2), whereby larger angle of view, higher performances, and compactness can be achieved, and various kinds of aberration can be made favorable even when used for reading images at a magnification near 1:1.

Also, since the imaging lens can be constituted by three lenses without using any aspheric surface, productivity is favorable, and the cost can be cut down.

TABLE 1

| f = 170 mm | $F_{NO}$ = 7.5 | ω = 19.3° | | |
|---|---|---|---|---|
| Surface | R | D | $n_d$ | $v_d$ |
| 1 | ∞ | 3.90 | 1.5225 | 59.5 |
| 2 | ∞ | | | |
| 3 | 57.124 | 5.00 | 1.8044 | 39.6 |
| 4 | −80.592 | 1.36 | | |
| 5 | −54.069 | 2.90 | n(z) | v(z) |
| 6 | 58.133 | 4.84 | | |
| 7 | −40.990 | 8.05 | 1.7550 | 52.3 |
| 8 | −34.319 | | | |
| 9 | ∞ | 1.90 | 1.5225 | 59.5 |
| 10 | ∞ | | | |
| a = 7.3 | N = 11 | Δn = 0.022 | | |
| $n_0$ = 1.76543 | | $n_6$ = 0.289762 × $10^{-3}$ | | |
| $n_1$ = −0.761421 × $10^{-3}$ | | $n_7$ = −0.424494 × $10^{-4}$ | | |
| $n_2$ = 0.1099473 × $10^{-2}$ | | $n_8$ = 0.398991 × $10^{-5}$ | | |
| $n_3$ = −0.454926 × $10^{-2}$ | | $n_9$ = −0.234432 × $10^{-6}$ | | |
| $n_4$ = 0.325547 × $10^{-2}$ | | $n_{10}$ = 0.786605 × $10^{-8}$ | | |
| $n_5$ = −0.125152 × $10^{-2}$ | | $n_{11}$ = −0.115307 × $10^{-9}$ | | |

TABLE 2

| f = 170 mm | $F_{NO}$ = 8.0 | ω = 21.2° | | |
|---|---|---|---|---|
| Surface | R | D | $n_d$ | $v_d$ |
| 1 | ∞ | 3.90 | 1.5225 | 59.5 |
| 2 | ∞ | | | |
| 3 | 67.900 | 6.68 | 1.8044 | 39.6 |
| 4 | −67.241 | 1.35 | | |
| 5 | −47.253 | 2.50 | n(z) | v(z) |
| 6 | 70.924 | 5.49 | | |
| 7 | −37.921 | 7.50 | 1.7550 | 52.3 |
| 8 | −32.060 | | | |
| 9 | ∞ | 1.90 | 1.5225 | 59.5 |
| 10 | ∞ | | | |
| a = 3.0 | N = 5 | Δn = 0.019 | | |
| $n_0$ = 1.73300 | | | | |
| $n_1$ = −0.753877 × $10^{-2}$ | | | | |
| $n_2$ = −0.406864 × $10^{-2}$ | | | | |
| $n_3$ = 0.134389 × $10^{-2}$ | | | | |
| $n_4$ = −0.163870 × $10^{-3}$ | | | | |
| $n_5$ = 0.737109 × $10^{-5}$ | | | | |

TABLE 3

| f = 170 mm | $F_{NO}$ = 8.0 | ω = 21.1° | | |
|---|---|---|---|---|
| Surface | R | D | $n_d$ | $v_d$ |
| 1 | ∞ | 3.90 | 1.5225 | 59.5 |
| 2 | ∞ | | | |
| 3 | 50.375 | 5.63 | 1.8044 | 39.6 |
| 4 | −72.886 | 1.04 | | |
| 5 | −52.543 | 1.00 | n(z) | v(z) |
| 6 | 47.158 | 8.87 | | |
| 7 | −44.561 | 7.63 | 1.7292 | 54.7 |
| 8 | −36.521 | | | |
| 9 | ∞ | 1.90 | 1.5225 | 59.5 |
| 10 | ∞ | | | |
| a = 5.0 | N = 8 | Δn = 0.005 | | |
| $n_0$ = 1.89587 | | $n_6$ = −0.439577 × $10^{-3}$ | | |
| $n_1$ −0.137179 | | $n_7$ = 0.303066 × $10^{-4}$ | | |
| $n_2$ = −0.265400 × $10^{-2}$ | | $n_8$ = −0.883893 × $10^{-6}$ | | |
| $n_3$ = 0.328435 × $10^{-1}$ | | | | |
| $n_4$ = −0.151928 × $10^{-2}$ | | | | |
| $n_5$ = 0.344672 × $10^{-2}$ | | | | |

TABLE 4

| f = 170 mm | $F_{NO}$ = 10.0 | ω = 21.4° | | |
|---|---|---|---|---|
| Surface | R | D | $n_d$ | $v_d$ |
| 1 | ∞ | 3.90 | 1.5225 | 59.5 |
| 2 | ∞ | | | |
| 3 | 61.808 | 4.21 | 1.8064 | 38.6 |
| 4 | −88.101 | 1.51 | | |
| 5 | −56.975 | 4.65 | n(z) | v(z) |
| 6 | 66.299 | 3.30 | | |
| 7 | −39.342 | 7.73 | 1.7762 | 55.0 |
| 8 | −33.042 | | | |
| 9 | ∞ | 1.90 | 1.5225 | 59.5 |
| 10 | ∞ | | | |
| a = 3.7 | N = 11 | Δn = 0.077 | | |
| $n_0$ = 1.77521 | | $n_6$ = −0.296730 × $10^{-2}$ | | |
| $n_1$ = 0.300605 × $10^{-2}$ | | $n_7$ = 0.566542 × $10^{-3}$ | | |
| $n_2$ = −0.215719 × $10^{-1}$ | | $n_8$ = −0.693026 × $10^{-4}$ | | |
| $n_3$ = 0.278094 × $10^{-1}$ | | $n_9$ = 0.524379 × $10^{-5}$ | | |
| $n_4$ = −0.214725 × $10^{-1}$ | | $n_{10}$ = −0.223610 × $10^{-6}$ | | |
| $n_5$ = 0.100206 × $10^{-1}$ | | $n_{11}$ = 0.411314 × $10^{-8}$ | | |

What is claimed is:

1. An imaging lens for copying to be used at a magnification near 1:1, said imaging lens comprising, successively from an object side, a first lens having a biconvex form, a second lens having a biconcave form with a refractive index distribution along an optical axis direction, and a third lens made of a positive meniscus lens having a concave surface directed onto the object side;

wherein said second lens has a refractive index decreasing from the object side to an image side, and a difference Δn between respective refractive index values at an object-side surface apex of said second lens and an image-side surface apex thereof satisfies the following conditional expression (1):

$$0 \leq \Delta n \leq 0.1 \qquad (1)$$

and;

wherein, letting a point on the optical axis at which the refractive index equals $n_0$ be a reference point, the distance from the reference point to the object-side surface apex of said second lens be a, and a distance from the object-side surface apex of said second lens along the optical axis direction be z, the refractive index n(z) of the second lens is represented by the following conditional expression (2):

$$n(z) = \sum_{i=0}^{n} n_i (z+a)^i ; 5 \leq N. \qquad (2)$$

2. A copying apparatus comprising the imaging lens for copying according to claim 1.

3. An imaging lens for copying in accordance with claim 1, wherein the magnification is near 1:1.

* * * * *